(12) United States Patent
Yang et al.

(10) Patent No.: US 11,675,396 B2
(45) Date of Patent: Jun. 13, 2023

(54) HINGE ASSEMBLY AND PORTABLE ELECTRONIC DEVICE

(71) Applicant: Acer Incorporated, New Taipei (TW)

(72) Inventors: Yi-Hsuan Yang, New Taipei (TW);
Wu-Chen Lee, New Taipei (TW);
Cheng-Nan Ling, New Taipei (TW);
Yi-Ta Huang, New Taipei (TW);
Hung-Jen Su, New Taipei (TW)

(73) Assignee: Acer Incorporated, New Taipei (TW)

( * ) Notice: Subject to any disclaimer, the term of this patent is extended or adjusted under 35 U.S.C. 154(b) by 65 days.

(21) Appl. No.: 17/351,214

(22) Filed: Jun. 17, 2021

(65) Prior Publication Data
US 2022/0147113 A1 May 12, 2022

(30) Foreign Application Priority Data

Nov. 9, 2020 (TW) .................................. 109139004

(51) Int. Cl.
| | |
|---|---|
| *G06F 1/16* | (2006.01) |
| *E05D 11/08* | (2006.01) |
| *F16C 11/04* | (2006.01) |
| *E05D 3/02* | (2006.01) |

(52) U.S. Cl.
CPC ............ *G06F 1/1681* (2013.01); *F16C 11/04* (2013.01); *E05D 3/02* (2013.01); *E05D 11/087* (2013.01); *E05Y 2201/26* (2013.01); *E05Y 2201/412* (2013.01); *E05Y 2201/424* (2013.01); *E05Y 2900/606* (2013.01)

(58) Field of Classification Search
CPC .................................................... G06F 1/1681
See application file for complete search history.

(56) References Cited

U.S. PATENT DOCUMENTS

| | | | | |
|---|---|---|---|---|
| 9,864,416 | B2 * | 1/2018 | Liang | ...................... G06F 1/1656 |
| 10,642,309 | B2 * | 5/2020 | Cheng | ....................... E05D 7/00 |
| 11,243,579 | B2 * | 2/2022 | Liu | ............................ E05D 3/18 |
| 11,435,785 | B2 * | 9/2022 | Song | ...................... G06F 1/1652 |

(Continued)

FOREIGN PATENT DOCUMENTS

| | | |
|---|---|---|
| CN | 2689662 | 3/2005 |
| TW | 566817 | 12/2003 |

(Continued)

OTHER PUBLICATIONS

"Search Report of Europe Counterpart Application", dated Mar. 2, 2022, pp. 1-8.

*Primary Examiner* — Lisa Lea-Edmonds
(74) *Attorney, Agent, or Firm* — JCIPRNET (57) ABSTRACT

A hinge assembly, including a rotating shaft and a pair of cams, is provided. The cams are sleeved on the rotating shaft so as to be rotatable relative to each other. The pair of cams respectively has a first flat surface and a second flat surface facing each other, and a curved surface adjacent to the first flat surface and the second flat surface. The first flat surface of one of the cams passes by the curved surface to move from one flat surface to the other flat surface of the other cam, so as to enable the pair of cams to move relatively away or closer along an axial direction of the rotating shaft. The curved surfaces of the cams are in surface contact when the first flat surface passes by the curved surface. A portable electronic device is also provided.

9 Claims, 8 Drawing Sheets

(56) References Cited

U.S. PATENT DOCUMENTS

| | | | |
|---|---|---|---|
| 2009/0165250 A1 | 7/2009 | Duan et al. | |
| 2009/0217486 A1* | 9/2009 | Itakura | G06F 1/1681 16/334 |
| 2010/0101053 A1* | 4/2010 | Li | G06F 1/1681 16/319 |
| 2010/0107369 A1 | 5/2010 | Li et al. | |
| 2019/0317552 A1* | 10/2019 | Cheng | G06F 1/1681 |
| 2022/0159109 A1* | 5/2022 | Kang | H04M 1/0268 |
| 2022/0221914 A1* | 7/2022 | Park | G06F 1/1616 |

FOREIGN PATENT DOCUMENTS

| | | |
|---|---|---|
| TW | M395990 | 1/2011 |
| WO | 2019004995 | 1/2019 |

* cited by examiner

HINGE ASSEMBLY AND PORTABLE ELECTRONIC DEVICE

CROSS-REFERENCE TO RELATED APPLICATION

This application claims the priority benefit of Taiwan application serial no. 109139004, filed on Nov. 9, 2020. The entirety of the above-mentioned patent application is hereby incorporated by reference herein and made a part of this specification.

BACKGROUND

Technical Field

This disclosure relates to a hinge assembly and a portable electronic device.

Description of Related Art

Currently, portable electronic devices commonly seen on the market such as a notebook computer, mostly have a hinge assembly between two bodies, so that the two bodies may be unfolded or closed relative to each other by the hinge assembly. In general, the hinge assembly includes a rotating shaft, and in order to enable the two bodies to generate a feeling of tight closure during the closing process, most of them will come with a design of a concave cam or a cam on the rotating shaft, so as to generate different torques by different stroke positions of the concave cam or the cam. However, the wearing situation of the concave cam or the cam in the past is unstable. A possible reason is that the designer did not take into consideration the uniformity of the wearing of the concave cam or the cam, which resulted in a single-point wearing (that is, a point contact) of the concave cam or the cam, as well as unable to achieve a stable opening and closing angle, and unable to achieve a stable opening and closing force.

Furthermore, a pair of cams is, for example, set on the rotating shaft of the existing hinge assembly, and the pair of cams respectively has a climbing surface opposite to each other. When the pair of cams is scrutinized from a side view direction, it can be seen that the climbing surfaces of the pair of cams are fitted to each other (that is, a line contact), which allows the designer to mistakenly believe that this design is already able to even out the wearing between the climbing surfaces of the pair of cams. However, the applicant of this disclosure realizes that when the pair of cams is dissected into multiple cross-sections along the side view direction, gaps (not fitting) are found between the climbing surfaces of the pair of cams. This will cause the pair of cams to have the single-point wearing (that is, the point contact) between the climbing surfaces during the process of relative rotation when scrutinized from the side view direction, which results in a fast and uneven wearing, as well as unable to achieve the stable opening and closing angle, and unable to achieve the stable opening and closing force.

SUMMARY

The disclosure provides a hinge assembly, which includes a rotating shaft and a pair of cams. The pair of cams is sleeved on the rotating shaft so as to be rotatable relative to each other. The pair of cams respectively has a first flat surface and a second flat surface facing each other, and a curved surface adjacent to the first flat surface and the second flat surface. The first flat surface of one of the cams passes by the curved surface to move from the second flat surface to the first flat surface of the other cam, or passes by the curved surface to move from the first flat surface to the second flat surface of the other cam during a relative rotation, so as to enable the pair of cams to move relatively away or closer along an axial direction of the rotating shaft. The curved surfaces of the pair of cams are in surface contact when the first flat surface passes by the curved surface.

The disclosure provides a portable electronic device, which includes a first body and a second body. The second body is pivotally connected to the first body by a hinge assembly. The hinge assembly includes a rotating shaft, a pair of cams, a first frame and a second frame. The pair of cams is sleeved on the rotating shaft so as to be rotatable relative to each other. The pair of cams respectively has a first flat surface and a second flat surface facing each other, and a curved surface adjacent to the first flat surface and the second flat surface. The first frame is fixed to the rotating shaft. The second frame is connected to one of the pair of cams. The second frame and the connected cam rotate relative to the other cam along the rotating shaft. The first flat surface of one of the cams passes by the curved surface to move from the second flat surface to the first flat surface of the other cam, or passes by the curved surface to move from the first flat surface to the second flat surface of the other cam during a relative rotation, so as to enable the pair of cams to move relatively away or closer along an axial direction of the rotating shaft. The curved surfaces of the pair of cams are in surface contact when the first flat surface passes by the curved surface.

Based on the above, the hinge assembly of the disclosure includes the rotating shaft and the pair of cams. The pair of cams is sleeved on the rotating shaft so as to be rotatable relative to each other. The pair of cams respectively has the first flat surface and the second flat surface facing each other, and the curved surface adjacent to the first flat surface and the second flat surface. The pair of cams moves relatively away along the axial direction of the rotating shaft, and the pair of curved surfaces of the pair of cams are in surface contact when the first flat surface passes by the curved surface, enabling their wearing to be slow and uniformed, thereby achieving the stable opening and closing angle and the stable opening and closing force.

To make the aforementioned more comprehensible, several embodiments accompanied with drawings are described in detail as follows.

DESCRIPTION OF THE EMBODIMENTS

Figure 1:
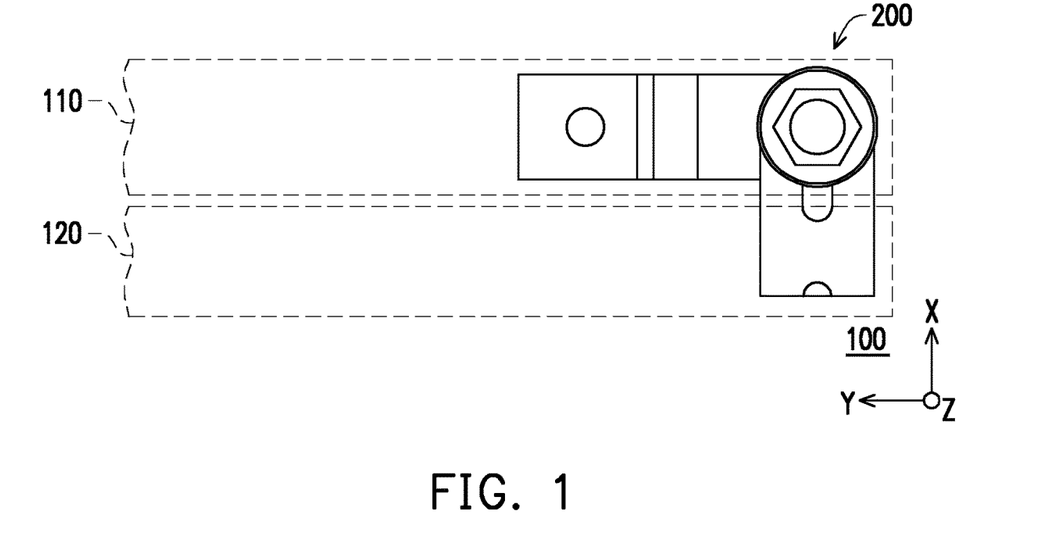
FIG. 1 is a schematic view of a portable electronic device according to an embodiment of the disclosure.

FIG. 1 is a schematic view of a portable electronic device according to an embodiment of the disclosure. With reference to FIG. 1, a hinge assembly 200 is suitable to be applied to a portable electronic device 100. The portable electronic device 100 includes a first body 110 and a second body 120. The second body 120 is pivotally connected to the first body 110 by the hinge assembly 200. Here, the portable electronic device 100 is, for example, a notebook computer, the first body 110 is a display of the notebook computer, the second body 120 is a host computer of the notebook computer, and the first body 110 is closed on the second body 120 as shown in FIG. 1. Although the portable electronic device 100 in the embodiment is described as a notebook computer, the disclosure is not limited thereto. At the same time, the embodiment provides Cartesian coordinates XYZ to facilitate subsequent description of components.

Figure 2:
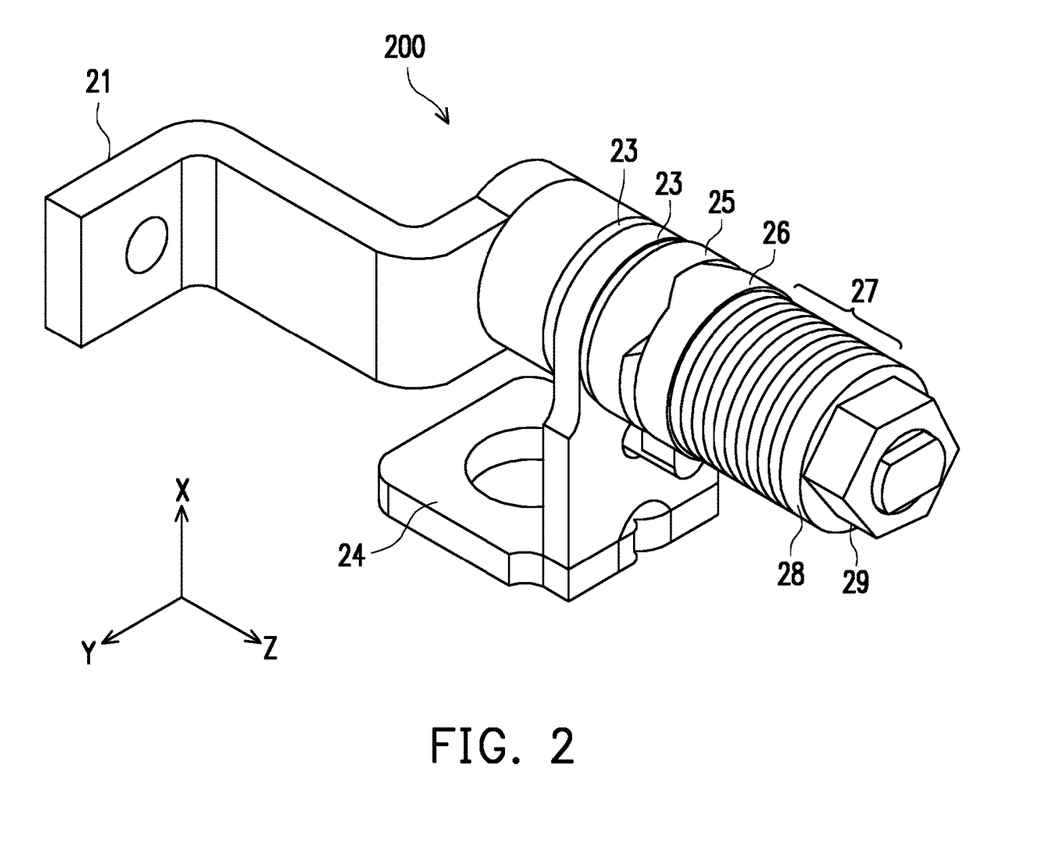
FIG. 2 is a schematic view of the hinge assembly of the portable electronic device in FIG. 1.
Figure 3:
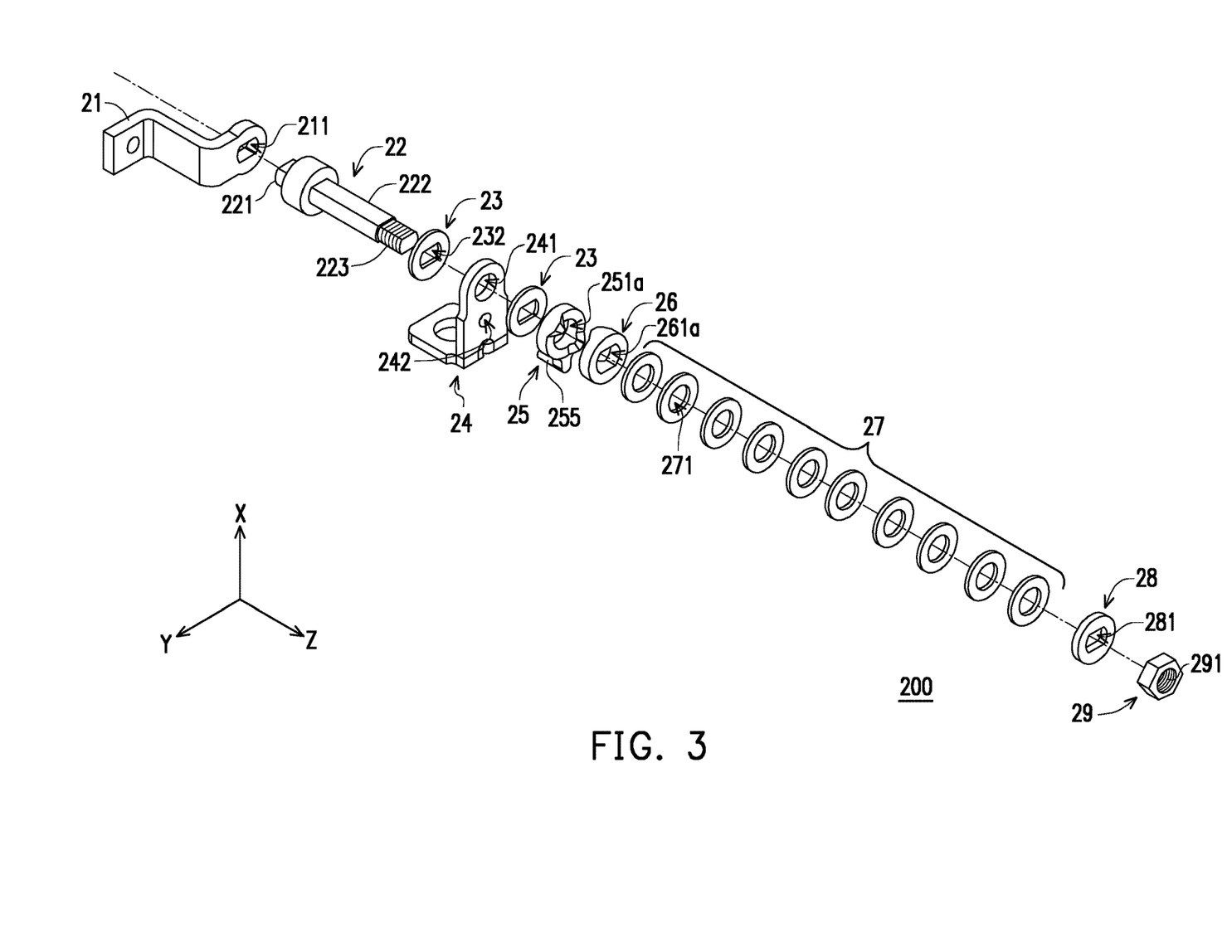
FIG. 3 is an exploded schematic view of the hinge assembly in FIG. 2.

FIG. 2 is a schematic view of the hinge assembly of the portable electronic device in FIG. 1. FIG. 3 is an exploded schematic view of the hinge assembly in FIG. 2. With reference to FIGS. 2 and 3, the hinge assembly 200 includes a first frame 24, a rotating shaft 22, friction pads 23, a second frame 21, a first cam 25, a second cam 26, an elastic member 27, a pad 28, and a nut 29. In the embodiment, the second frame 21 is fixedly set with the first body 110 shown in FIG. 1 to become one body, and is geared to the first body 110 shown in FIG. 1. The first frame 24 is fixedly set with the second body 120 to become one body, and is geared to the second body 120 shown in FIG. 1.

In the embodiment, the rotating shaft 22 has two opposite ends, and includes a non-circular shaft 221 and a non-circular shaft 222 respectively configured at the two ends. The non-circular shaft 221 of the rotating shaft 22 is sleeved in a non-circular hole 211 of the second frame 21, a round hole 251a of the first cam 25 is sleeved on the non-circular shaft 222, and a non-circular hole 261a of the second cam 26 is sleeved on the non-circular shaft 222. In other words, both the second frame 21 and the second cam 26 are fixedly connected to the rotating shaft 22. Therefore, the first body 110 drives the second frame 21 when a user unfolds or closes the first body 110 relative to the second body 120, thereby driving the rotating shaft 22 and the second cam 26, and enabling the second cam 26 to rotate along a Z axis relative to the first cam 25.

Furthermore, the elastic member 27 of the embodiment is sleeved on the non-circular shaft 222 of the rotating shaft 22 by a round hole 271, and is disposed on one side of the second cam 26. Here, an axial direction of the rotating shaft 22 is consistent with the Z axis, and the elastic member 27 tightly abuts against the first cam 25 and the second cam 26 towards a negative Z axis direction. Therefore, the second cam 26 rotates relative to the first cam 25, causing the elastic member 27 to be squeezed by the second cam 26 when the user unfolds or closes the first body 110 relative to the second body 120. At this time, the elastic member 27 will generate an elastic restoring force, enabling the second cam 26 to maintain a pressure-resisting relationship with the first cam 25, so as to generate a required torque. In the embodiment, the elastic member 27 is, for example, an elastic pad, but in other embodiments, the elastic member 27 may also be a spring, and is not limited thereto.

In addition, the first frame 24 of the embodiment has a round hole 241 and a positioning hole 242. The non-circular shaft 222 of the rotating shaft 22 passes through the round hole 241 and is inserted into the first frame 24. The first cam 25 includes a positioning column 255. The positioning column 255 is configured to be plugged into the positioning hole 242 of the first frame 24 to limit the position of the first cam 25. The friction pad 23 has a non-circular hole 232 to be sleeved on the non-circular shaft 222. One of the friction pads 23 is disposed between the rotating shaft 22 and the first frame 24, while the other of the friction pads 23 is disposed between the first frame 24 and the first cam 25.

In the embodiment, the pad 28 has a non-circular hole 281, and the pad 28 is sleeved on the non-circular shaft 222 of the rotating shaft 22 and is located between the elastic member 27 and the nut 29. A thread 291 is disposed inside the nut 29, and is disposed at one end of the pad 28. The nut 29 is screwed and fixed to a thread 223 of the non-circular shaft 222 by the screw 291.

Figure 4:
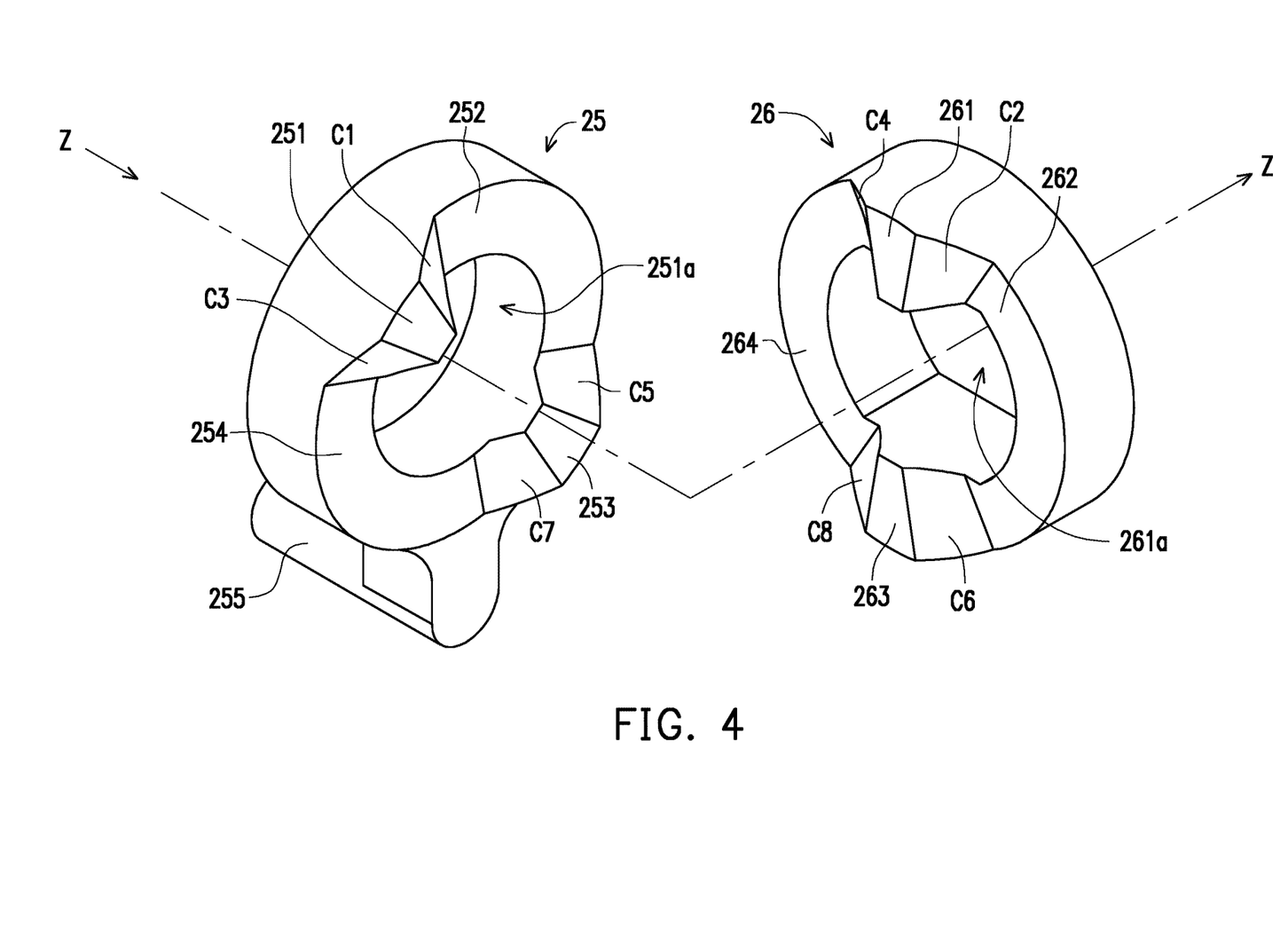
FIG. 4 is a schematic view of the cam of the hinge assembly in FIG. 1.

FIG. 4 is a schematic view of the cam of the hinge assembly in FIG. 1. With reference to FIGS. 3 and 4 concurrently, in the embodiment, the first cam 25 and the second cam 26 respectively have first flat surfaces 251, 253, 261, and 263, and second flat surfaces 252, 254, 262, and 264 that face each other, a curved surface C1 adjacent to in-between of the first flat surface 251 and the second flat surface 252, a curved surface C3 adjacent to in-between of the first flat surface 251 and the second flat surface 254, a curved surface C5 adjacent to in-between of the first flat surface 253 and the second flat surface 252, a curved surface C7 adjacent to in-between of the first flat surface 253 and the second flat surface 254, a curved surface C2 adjacent to in-between of the first flat surface 261 and the second flat surface 262, a curved surface C4 adjacent to in-between of the first flat surface 261 and the second flat surface 264, a curved surface C6 adjacent to in-between of the first flat surface 263 and the second flat surface 262, and a curved surface C8 adjacent to in-between of the first flat surface 263 and the second flat surface 264. In the first cam 25 of the embodiment, its first flat surfaces 251 and 253 are substantially located on the same flat surface, its second flat surfaces 252 and 254 are located on the same flat surface, and its first flat surfaces 251 and 253 protrude from (are higher than) its second flat surfaces 252 and 254 along the Z axis. The first flat surfaces 251 and 253 and the second flat surfaces 252 and 254 are disposed symmetrically to each other, that is, a gap between the first flat surfaces 251 and 253 is a central angle of 180 degrees, and likewise for the second flat surfaces 252 and 254. Similarly, the first flat surfaces 261 and 263 and the second flat surfaces 262 and 264 of the second cam 26 also have corresponding surface features as the first cam 25. Accordingly, thicknesses of the first cam 25 and the second cam 26 along the Z axis are in a state of increase or decrease, and may generate different torques along with the location of the hinge assembly 200 at different rotation strokes. In addition, since the above flat surfaces are disposed with the central angle of 180 degrees as their disposition frequency (disposed symmetrically with the central angle of 180 degrees), a part of the flat surfaces and a part of the curved surfaces are used as examples for description subsequently. Here, the central angles of the first cam 25 and the second cam 26 are equivalent to relative rotations of the first body 110 and the second body 120.

Figure 5A:
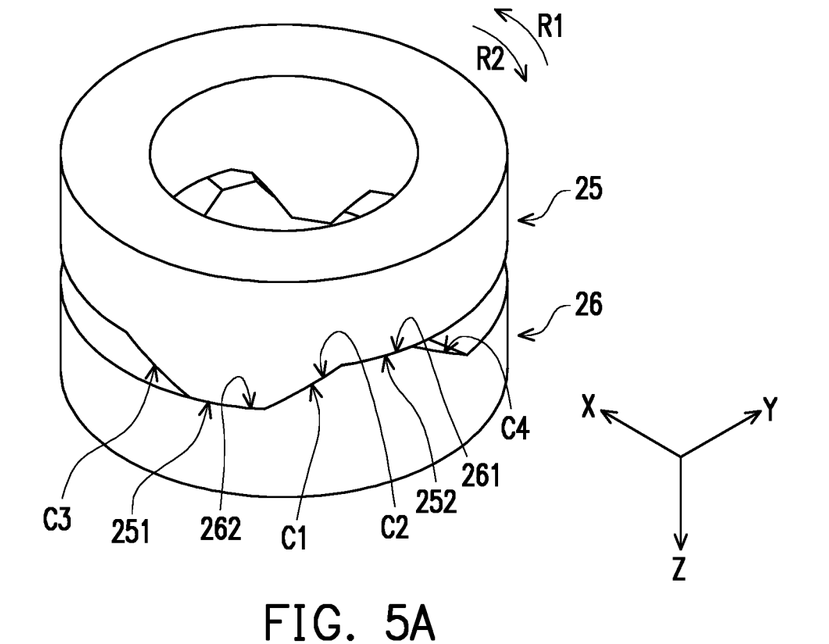
FIGS. 5A to 5C are schematic views of the cam in FIG. 1 in different states.
Figure 5B:
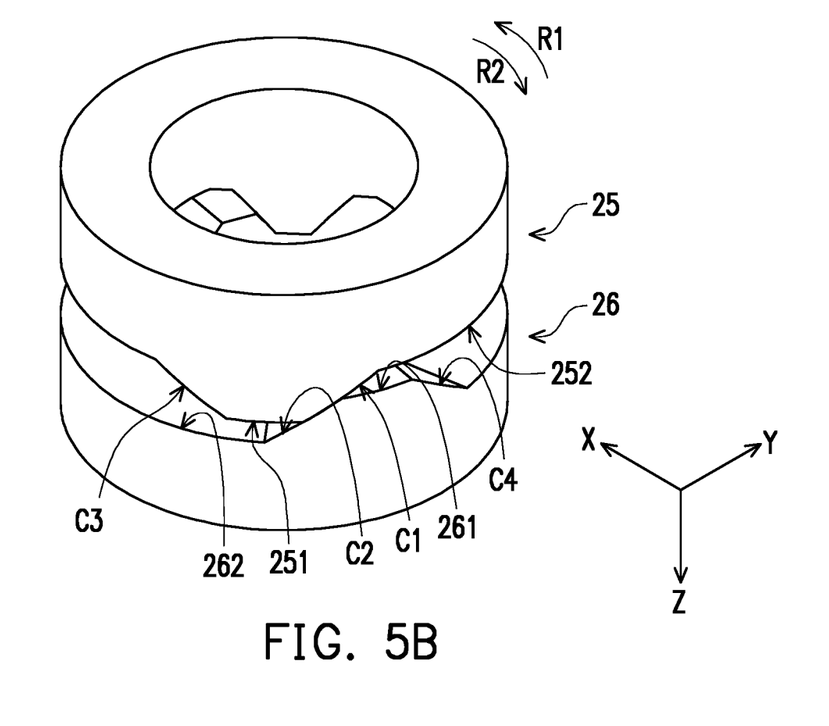
Figure 5C:
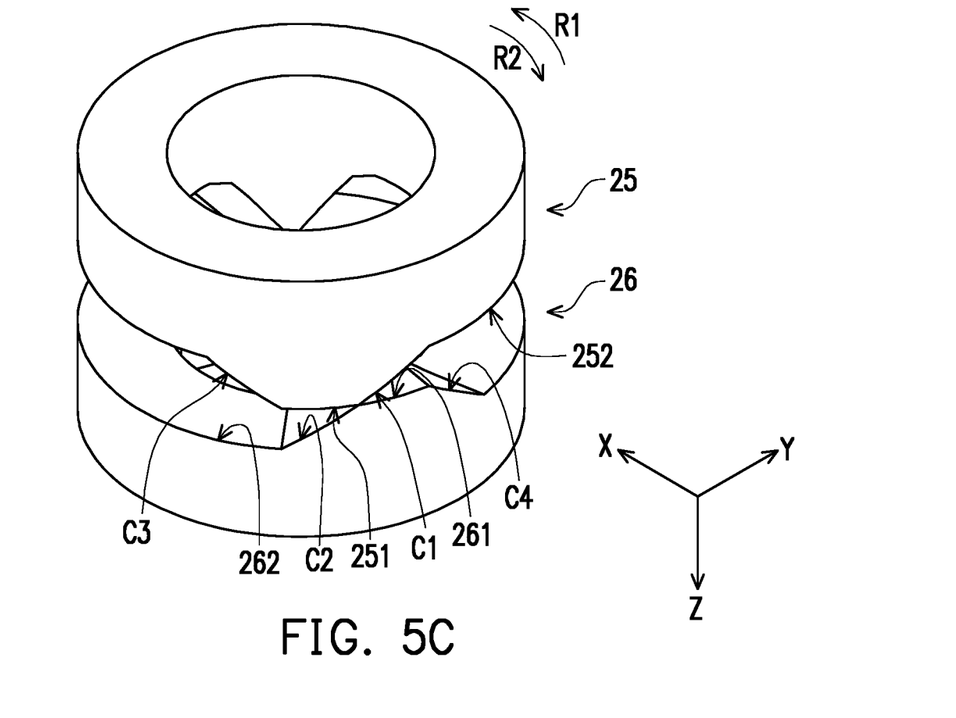
Figure 6A:
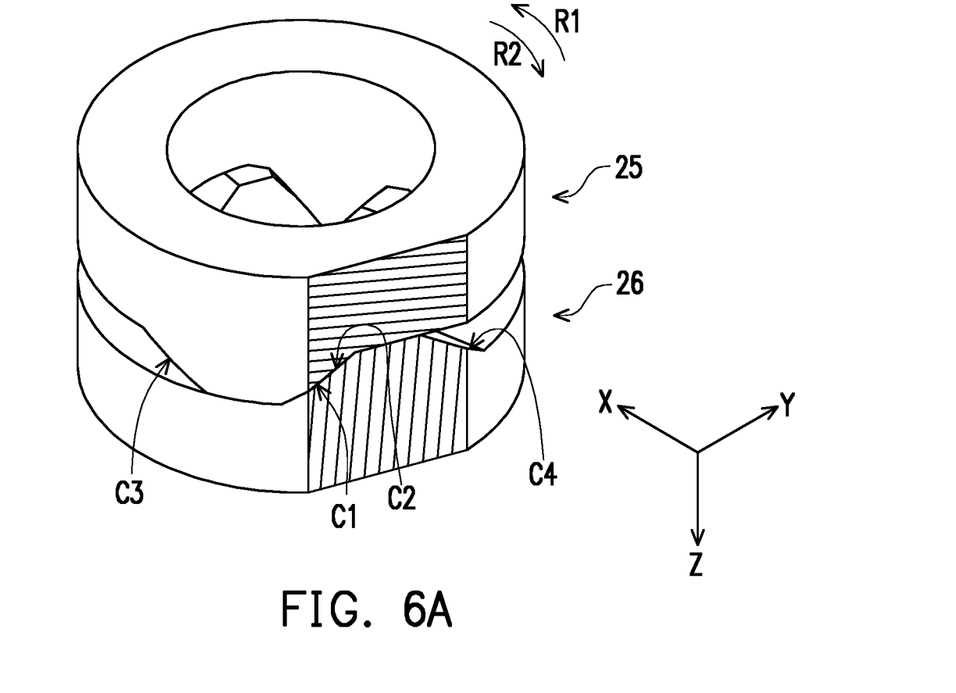
FIGS. 6A to 6C are schematic cross-sectional views of the cam in FIG. 5A.
Figure 6B:
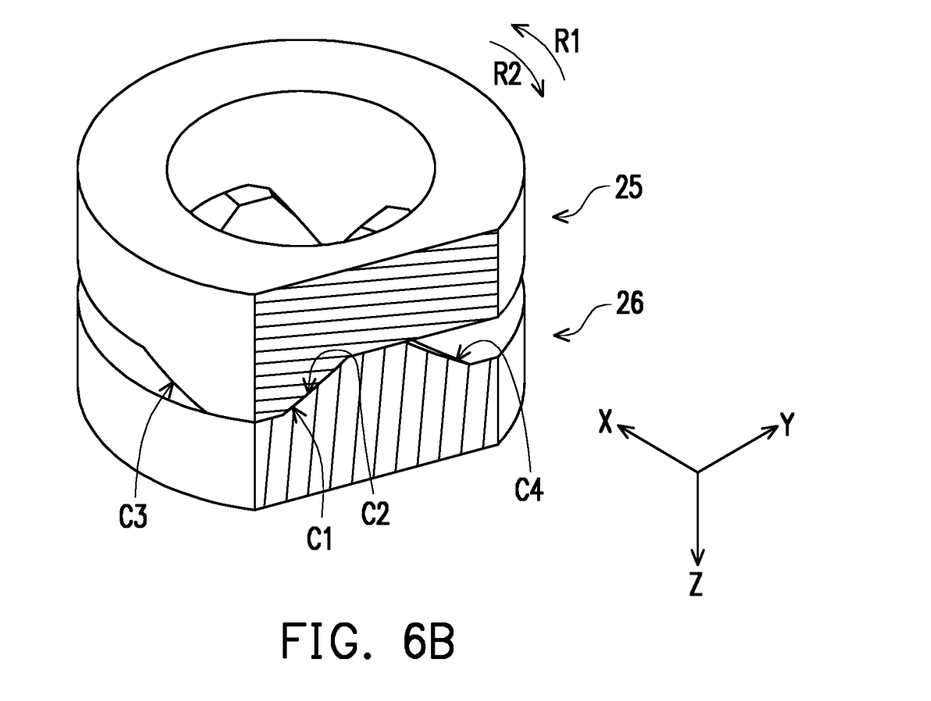
Figure 6C:
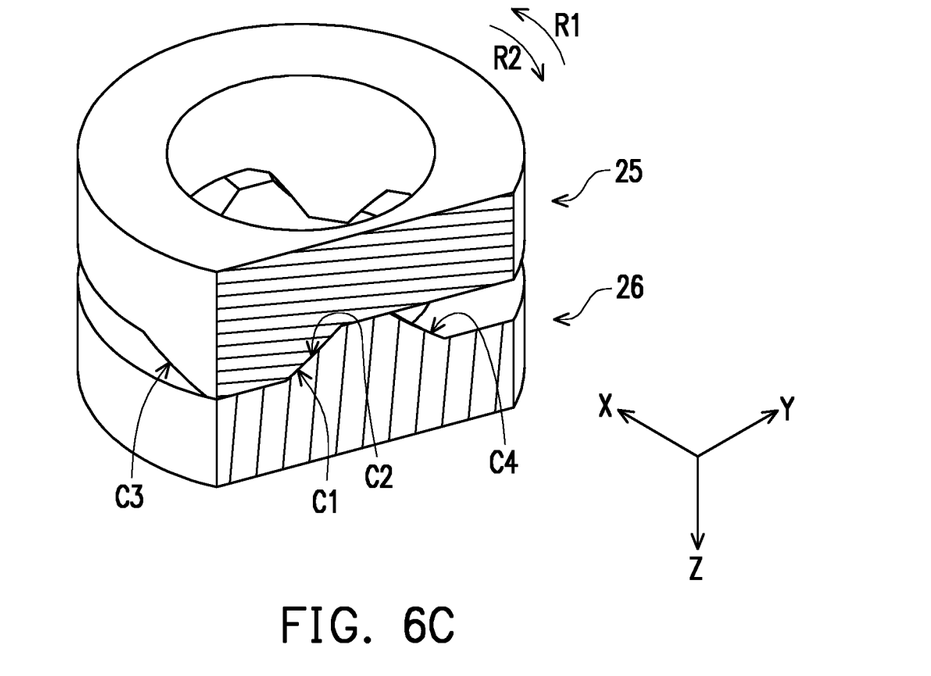
Figure 7A:
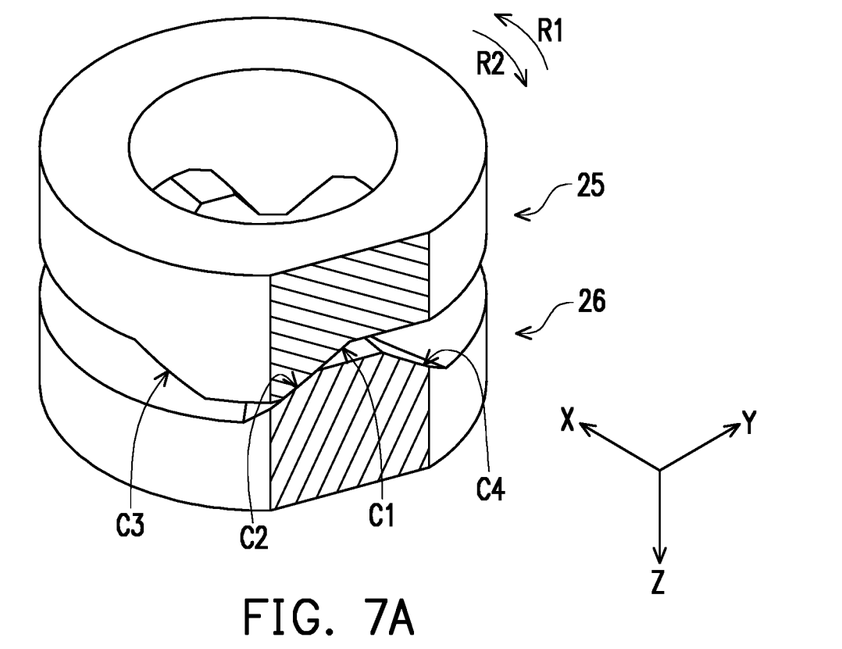
FIGS. 7A to 7C are schematic cross-sectional views of the cam in FIG. 5B.
Figure 7B:
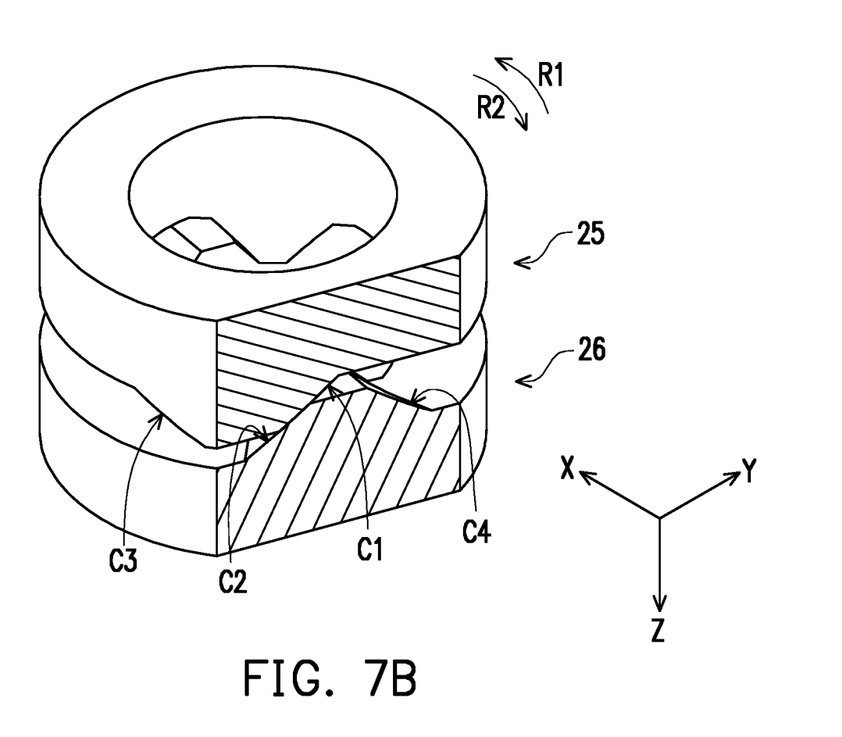
Figure 7C:
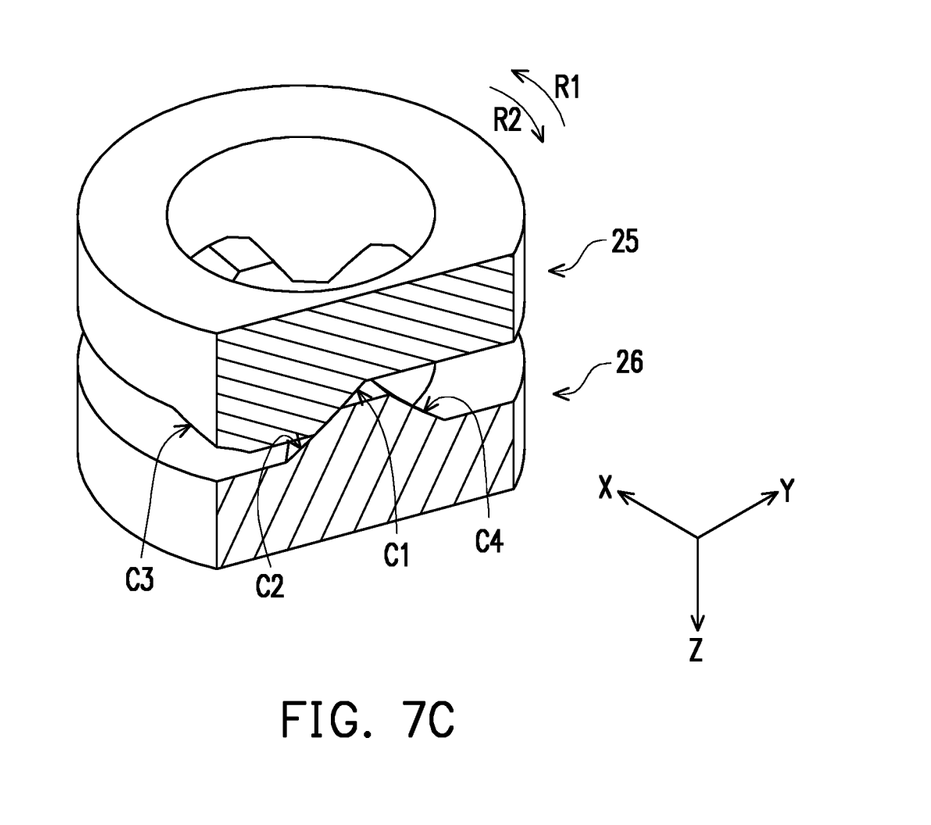

FIGS. 5A to 5C are schematic views of the cam in FIG. 1 in different states. FIGS. 6A to 6C are schematic cross-sectional views of the cam in FIG. 5A. FIGS. 7A to 7C are schematic cross-sectional views of the cam in FIG. 5B. It should be noted that some non-related structures in FIGS. 5A to 7C are omitted, so as to facilitate display and identification of required component parts.

FIG. 5A shows the first body 110 of the portable electronic device 100 in FIG. 1 when it is in a closed state (an included angle is regarded as 0 degrees) relative to the second body 120, that is, as shown in FIG. 1. Next, FIG. 5B shows what is equivalent to the first body 110 rotating on the Z axis relative to the second body 120, and enabling the first cam 25 to unfold from 0 degrees to 10 degrees relative to the second cam 26 along a rotational direction R1. At this point of time, the first flat surface 251 of the first cam 25 is separated from the second flat surface 262 of the second cam 26, the first cam 25 and the second cam 26 (along the Z axis) gradually move away from each other, and a contact area between the curved surface C1 and the curved surface C2 gradually decreases. If the second cam 26 is used as a reference, then it is seen as an action trend where the first cam 25 gradually climbs along the curved surface C2. However, as mentioned previously, the first cam 25 and the second cam 26 are actually subjected to the influence of being tightly abutted by the elastic member 27. Therefore, the first cam 25 and the second cam 26 that are moving away from each other will interact with the elastic member 27 to generate a force of the Z axis, thereby forming a torque of the hinge assembly 200 to support the first body 110 that is rotated and unfolded relative to the second body 120. Next, as shown in FIG. 5C, the first cam 25 rotates more than 30 degrees in the rotational direction R1 relative to the second cam 26, which is equivalent to when the first body 110 of the portable electronic device 100 is unfolded more than 30 degrees relative to the second body 120, the curved surface C1 is separated from the curved surface C2, and the first flat surface 251 of the first cam 25 begins to be in contact with the first flat surface 261 of the second cam 26 to obtain a stable torque. In short, the first cam 25 and the second cam 26 rotate relatively, and the first flat surface 251 of the first cam 25 passes by the curved surface C2 to move from the second flat surface 262 to the first flat surface 261 of the second cam 26, so as to enable the first cam 25 and the second cam 26 to move relatively away along the Z direction of the Cartesian coordinates during the relative rotation and decreases the contact area between the curved surfaces C1 and C2 when the user pulls the first body 110 in FIG. 1, enabling the hinge assembly 200 to move from the closed state to an open state. In particular, the curved surfaces C1 and C2 of the first cam 25 and the second cam 26 are in surface contact when the first flat surface 251 passes by the curved surface C2.

Conversely, during a process where the first body 110 of the portable electronic device 100 is converted from an unfolded state to the closed state relative to the second body 120, which is equivalent to the first cam 25 being converted from the state shown in FIG. 5C to the state shown in FIG. 5A along a rotational direction R2, the first cam 25 and the second cam 26 are enabled to move closer to each other, and the contact area between the curved surfaces C1 and C2 is increased.

It is worth mentioning that in the embodiment, the curved surfaces C1 to C8 of the first cam 25 and the second cam 26 all have a specific curved surface contour, to facilitate two curved surfaces that are abutting each other to maintain a state of being in surface contact. Here, a curved surface equation of the curved surface in the Cartesian coordinates system XYZ is $Z=-1.16036X+0.30036Y+0.35035XY+0.15317X^2-0.13422Y^2+A_1$, where the Z axis of the Cartesian coordinates system is an axis of rotation of the rotating shaft 22. In the embodiment, $A_1$ is a constant, and a range of $A_1$ is $-0.32039$ to $0.27961$.

With reference to FIGS. 6A to 6C and in comparison with FIG. 5A concurrently, taking the curved surfaces C1 and C2 as examples, FIGS. 6A to 6C show the first cam 25 and the second cam 26 being gradually dissected toward a positive X axis, and it may be clearly seen that in the embodiment, the curved surfaces C1 and C2 of the first cam 25 and the second cam 26 are always in surface contact. This is because the curved surface C1 and C2 have the above-mentioned curved surface equation. In this way, the wearing between the curved surfaces C1 and C2 is uniform, and a stable opening and closing angle can be achieved, thereby achieving a stable opening and closing force. In addition, with reference to FIGS. 7A to 7C and in comparison with FIG. 5B, the curved surfaces C1 and C2 still maintain a state of being in surface contact at this point of time, as compared with the foregoing FIGS. 6A and 6B. It is clearly seen from this that the curved surfaces C1 and C2 have the above-mentioned specific curved surface equation, thereby enabling the curved surfaces C1 and C2 to still be in surface contact during the process of relative rotation of the first cam 25 and the second cam 26, therefore effectively reducing the wearing of in-between the abutting surfaces. It should be noted that different cross-sectional positions are only schematically depict in FIGS. 6A to 7C to show the contact situation between the curved surfaces C1 and C2, but in fact, the cross-sectional positions are not limited to those shown in FIGS. 6A to 7C.

In summary, the hinge assembly of the disclosure includes the rotating shaft and the pair of cams. The pair of cams is sleeved on the rotating shaft so as to be rotatable relative to each other. The pair of cams respectively has the first flat surface and the second flat surface facing each other, and the curved surface adjacent to the first flat surface and the second flat surface. The pair of cams moves relatively away along the axial direction of the rotating shaft, and the pair of curved surfaces of the pair of cams are in surface contact when the first flat surface passes by the curved surface. This is because the curved surfaces of the first cam and the second cam are always in surface contact even in the case of a cross-sectional view. Therefore, the wearing of the in-between the curved surfaces of the pair of cams of the hinge assembly of the disclosure is slow and uniformed, and can achieve the stable opening and closing angle, thereby achieving the stable opening and closing force.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A hinge assembly, comprising:
a rotating shaft; and
a pair of cams, sleeved on the rotating shaft so as to be rotatable relative to each other, wherein the pair of cams respectively has a first flat surface and a second flat surface facing each other, and a curved surface adjacent to the first flat surface and the second flat surface, wherein the first flat surface of one of the cams passes by the curved surface to move from the second flat surface to the first flat surface of the other cam, or passes by the curved surface to move from the first flat surface to the second flat surface of the other cam during a relative rotation, so as to enable the pair of cams to move relatively away or closer along an axial direction of the rotating shaft, wherein a pair of the curved surfaces of the pair of cams remain in surface contact when the first flat surface passes by the curved surface.

2. The hinge assembly according to claim 1, wherein a curved surface equation of the curved surface in Cartesian coordinates system XYZ is:

$$Z=-1.16036X+0.30036Y+0.35035XY+0.15317X2-0.13422Y2+A1,$$

where an Z axis of the Cartesian coordinates system is an axis of rotation of the rotating shaft, A1 is a constant, and a range of A1 is −0.32039 to 0.27961.

3. The hinge assembly according to claim 1, further comprising at least one elastic member sleeved on the rotating shaft, wherein the elastic member tightly abuts against the pair of cams along the axial direction of the rotating shaft.

4. The hinge assembly according to claim 1, further comprising:
a first frame, sleeved on the rotating shaft; and
a second frame, fixed to the rotating shaft and connected to one of the pair of cams, wherein the second frame and the connected cam rotate relative to the other cam along the rotating shaft.

5. The hinge assembly according to claim 1, wherein the pair of cams move away from each other to enable a contact area between the pair of the curved surfaces to decrease, and the pair of cams moves closer to each other to enable the contact area between the pair of the curved surfaces to increase during a relative rotation.

6. A portable electronic device, comprising:
a first body; and
a second body, pivotally connected to the first body by the hinge assembly, wherein the hinge assembly comprises:
a rotating shaft;
a pair of cams, sleeved on the rotating shaft so as to be rotatable relative to each other, wherein the pair of cams respectively has a first flat surface and a second flat surface facing each other, and a curved surface adjacent to the first flat surface and the second flat surface;
a first frame, fixed to the rotating shaft; and
a second frame, connected to one of the pair of cams, wherein the second frame and the connected cam rotate relative to the other cam along the rotating shaft,
wherein the first flat surface of one of the cams passes by the curved surface to move from the second flat surface to the first flat surface of the other cam, or passes by the curved surface to move from the first flat surface to the second flat surface of the other cam during a relative rotation, so as to enable the pair of cams to move relatively away or closer along an axial direction of the rotating shaft, wherein a pair of the curved surfaces of the pair of cams remain in surface contact when the first flat surface passes by the curved surface.

7. The portable electronic device according to claim 6, wherein a curved surface equation of the curved surface in Cartesian coordinates system XYZ is:

$$Z=-1.16036X+0.30036Y+0.35035XY+0.15317X2-0.13422Y2+A1,$$

where an Z axis of the Cartesian coordinates system is an axis of rotation of the rotating shaft, A1 is a constant, and a range of A1 is −0.32039 to 0.27961.

8. The portable electronic device according to claim 6, further comprising at least one elastic member sleeved on the rotating shaft, wherein the elastic member tightly abuts against the pair of cams along the axial direction of the rotating shaft.

9. The portable electronic device according to claim 6, wherein the pair of cams move away from each other to enable a contact area between the pair of the curved surfaces to decrease, and the pair of cams moves closer to each other to enable the contact area between the pair of the curved surfaces to increase during a relative rotation.

\* \* \* \* \*